US009239218B2

(12) United States Patent
Su (10) Patent No.: US 9,239,218 B2
(45) Date of Patent: Jan. 19, 2016

(54) SIZE INSPECTION DEVICE (71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Rong-Chun Su, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 131 days.

(21) Appl. No.: 14/076,365

(22) Filed: Nov. 11, 2013

(65) Prior Publication Data
US 2014/0160496 A1 Jun. 12, 2014

(30) Foreign Application Priority Data

Dec. 7, 2012 (CN) .................... 2012 2 06697862 U (51) Int. Cl.
*G01B 5/04* (2006.01)
*G01B 5/00* (2006.01)
*G01B 11/06* (2006.01)
*G01B 7/06* (2006.01)

(52) U.S. Cl.
CPC .......... *G01B 5/0002* (2013.01); *G01B 11/0691* (2013.01); *G01B 5/0004* (2013.01); *G01B 5/04* (2013.01); *G01B 7/087* (2013.01); *G01B 7/107* (2013.01)

(58) Field of Classification Search
CPC ............... G01B 11/069; G01B 5/0002; G01B 11/0691; G01B 7/107; G01B 2210/44; G01B 7/087; G01B 5/0004; G01B 5/04; G01B 5/068

USPC ..................... 356/237.1–241.6, 242.1–243.8, 356/426–431, 600–640
See application file for complete search history.

(56) References Cited

U.S. PATENT DOCUMENTS

| 3,902,432 | A | * | 9/1975 | Shortridge | ................ B61B 9/00 104/93 |
| 3,930,994 | A | * | 1/1976 | Conway et al. | ................ 209/579 |
| 4,800,703 | A | * | 1/1989 | Goodman | ......................... 53/53 |
| 4,892,181 | A | * | 1/1990 | Hogenkamp | ................. 198/434 |
| 5,096,043 | A | * | 3/1992 | Gorrieri et al. | ............ 198/461.1 |
| 5,322,152 | A | * | 6/1994 | Tommila et al. | ............... 194/212 |

(Continued)

*Primary Examiner* — Gregory J Toatley
*Assistant Examiner* — Jarreas C Underwood
(74) *Attorney, Agent, or Firm* — Novak Druce Connolly Bove + Quigg LLP (57) ABSTRACT

A size inspection device includes an inspection frame, a transferring belt, a positioning assembly, an inspection assembly, a suction assembly, and a controller. The transferring belt is slidably mounted on the inspection frame. The positioning assembly, the inspection assembly, the suction assembly, and the controller are mounted on the inspection frame. The controller is electrically connected to the inspection assembly and the suction assembly. When the positioning assembly positions the workpiece on the transferring belt below the inspection assembly, the inspection assembly obtains size value of the workpiece and transfers it to the controller, the controller compares the size value to a preset standard range to determine whether or not the workpiece has passed quality inspection, and controls the suction assembly to handle the workpiece which is not of passing quality away from the transferring belt.

18 Claims, 5 Drawing Sheets

(56) References Cited

U.S. PATENT DOCUMENTS

| | | | | |
|---|---|---|---|---|
| 5,361,912 A * | 11/1994 | Krieg | ................ | B07C 5/3408 |
| | | | | 209/524 |
| 5,380,139 A * | 1/1995 | Pohjonen | ............. | B65G 1/0435 |
| | | | | 414/273 |
| 5,501,571 A * | 3/1996 | Van Durrett et al. | ......... | 414/801 |
| 5,641,072 A * | 6/1997 | Otake | ........................... | 209/524 |
| 5,699,161 A * | 12/1997 | Woodworth | ........... | G01B 11/04 |
| | | | | 356/628 |
| 5,782,339 A * | 7/1998 | Drewitz | .................... | 198/836.3 |
| 5,966,457 A * | 10/1999 | Lemelson | ................ | B07C 3/18 |
| | | | | 382/141 |
| 6,120,241 A * | 9/2000 | Huang et al. | ................... | 414/801 |
| 6,241,065 B1 * | 6/2001 | Kohlenberg et al. | ............ | 191/50 |
| 7,258,237 B2 * | 8/2007 | Nielsen | ........................ | 209/645 |
| 7,753,191 B2 * | 7/2010 | Lykkegaard et al. | ......... | 198/401 |
| 2002/0157919 A1 * | 10/2002 | Sherwin | ................... | 198/370.01 |
| 2005/0277532 A1 * | 12/2005 | Iwasa et al. | ...................... | 493/12 |
| 2013/0076891 A1 * | 3/2013 | Childress | ............ | G01N 21/909 |
| | | | | 348/127 |
| 2013/0141115 A1 * | 6/2013 | Bourely et al. | ................ | 324/637 |

* cited by examiner

SIZE INSPECTION DEVICE

BACKGROUND

1. Technical Field

The present disclosure relates to a size inspection device, and particularly to a size inspection device for detecting and inspecting size dimensions of a workpiece.

2. Description of Related Art

When determining or assessing whether various size dimensions of a workpiece are within preset quality specification tolerance, to be considered as passing or failing size inspection test, a detecting and inspection device, such as a micrometer caliper, is employed to measure a length value, a width value, and a thickness value of the workpiece. However, obtaining the above-mentioned size parameters by using the micrometer caliper is time consuming, thereby reducing an efficiency of the size measuring procedure.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
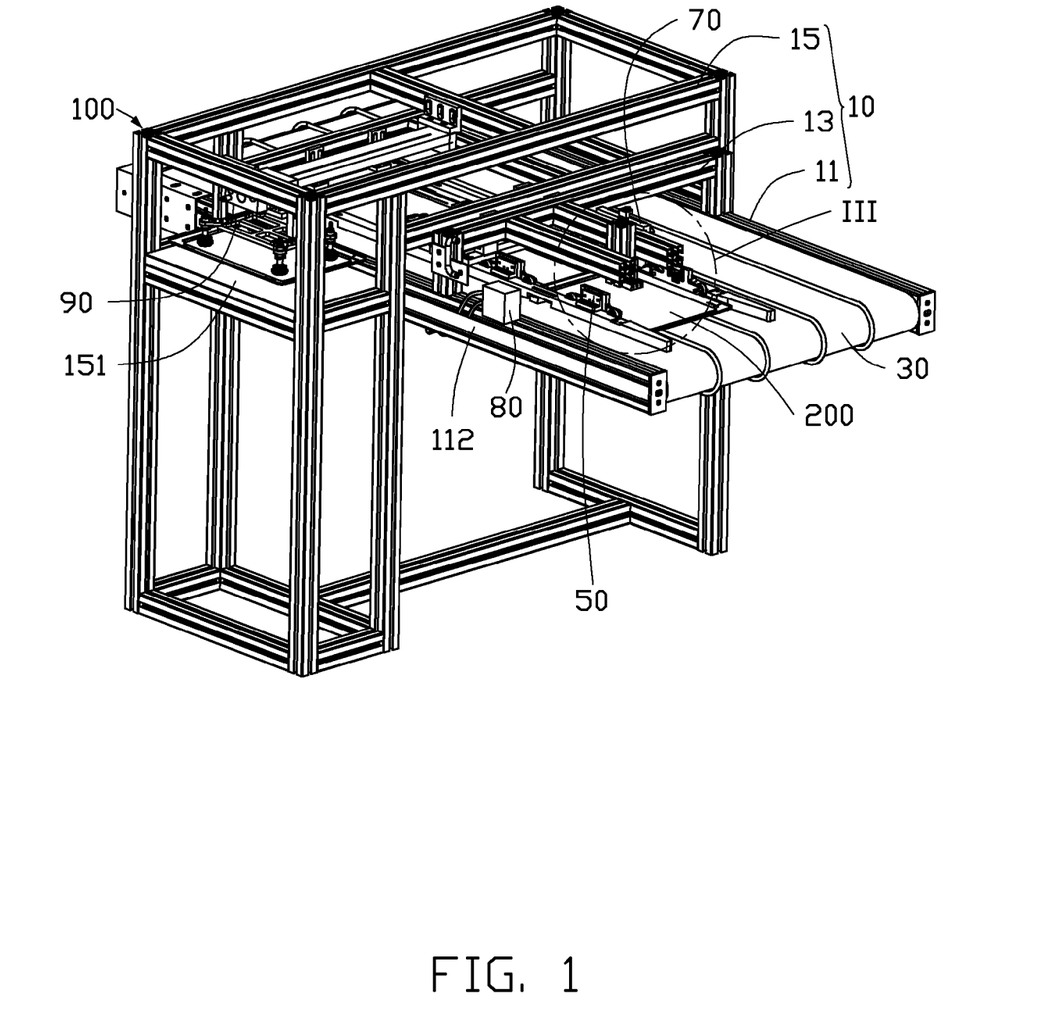
FIG. 1 is an isometric view of an embodiment of a size inspection device including a suction assembly.
Figure 2:
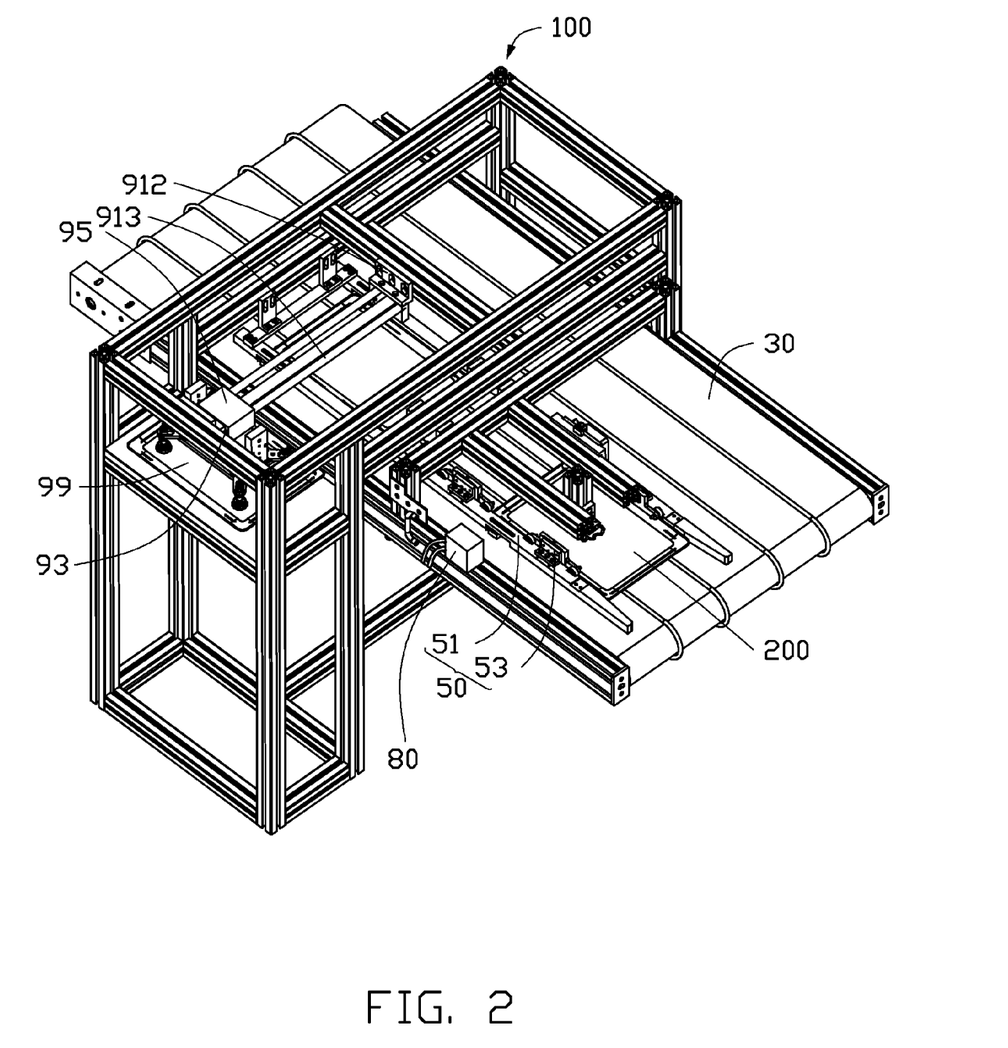
FIG. 2 is similar to FIG. 1, but viewed from another aspect.

FIGS. 1 and 2 show an embodiment of a size inspection device 100 employed to inspect size dimensions of a workpiece 200 automatically. In the embodiment, the size inspection device 100 determines whether or not a thickness value (a size value) of the workpiece 200 has passed quality inspection. The size inspection device 100 includes an inspection frame 10, a transferring belt 30, a positioning assembly 50, an inspection assembly 70, a suction assembly 90, and a controller 80. The transferring belt 30 is slidably mounted on the inspection frame 10; the positioning assembly 50 is fixedly mounted on the inspection frame 10 and positioned above the transferring belt 30. The inspection assembly 70 is mounted on the inspection frame 10 and positioned above the positioning assembly 50 to inspect the workpiece 200 being positioned by the positioning assembly 50. The suction assembly 90 is mounted on the inspection frame 10 adjacent to the inspection assembly 70, and located at a front side of a transferring direction of the transferring belt 30 for suction the workpiece 200 which has failed inspection. The controller 80 is mounted on the inspection frame 10, and electrically connected to the inspection assembly 70 and the suction assembly 90. The positioning assembly 50 positions the workpiece 200 on the transferring belt 30. The inspection assembly 70 obtains the thickness value (size value) of the workpiece 200, and transfers it (thickness/size value data) to the controller 80. The controller 80 compares the thickness value of the workpiece 200 to a preset thickness standard range or thickness quality specification tolerance to determine whether or not the workpiece 200 has passed quality inspection for thickness thereof. If the workpiece 200 is not considered as passing inspection, the controller 80 controls the suction assembly 90 to suck on the workpiece 200 and thereby transporting the workpiece 200 away from the transferring belt 30.

The inspection frame 10 includes a supporting bracket 11, a first fixing portion 13, and a second fixing portion 15. The supporting bracket 11 includes a supporting portion 12. The first fixing portion 13 is fixed to the supporting portion 12; the second fixing portion 15 stretches across opposite sides of the first fixing portion 13, and is arranged parallel to the first fixing portion 13. The second fixing portion 15 includes a recycling portion 151 at a side thereof. The transferring belt 30 is supported by a supporting portion 112, and positioned below the first fixing portion 13 and the second fixing portion 15 for transferring the workpiece 200.

Figure 3:
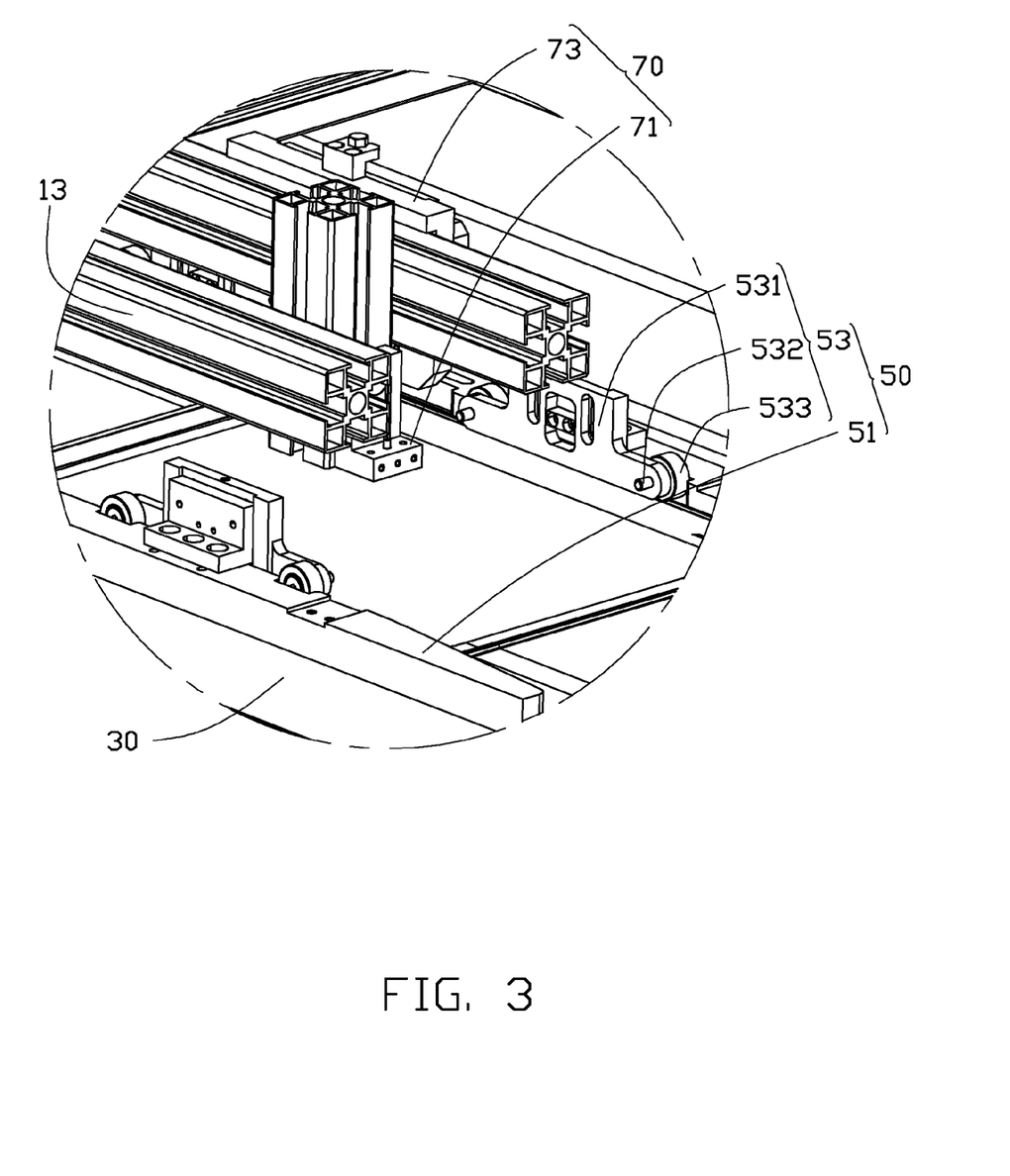
FIG. 3 is an enlarged view of a circled portion III of FIG. 1.

FIG. 3 shows that the positioning assembly 50 includes a pair of guiding rods 51, and a plurality of positioning subassemblies 53. The pair of guiding rods 51 are mounted on the first fixing portion 13. The pair of guiding rods 51 are arranged parallel to each other and positioned above the transferring belt 30. The workpiece 200 is transferred by the transferring belt 30 to slide between the pair of guiding rods 51. The plurality of positioning subassemblies 53 are divided into two groups symmetrically arranged on the pair of guiding rods 51. One group of the positioning subassembly 53 is mounted on one guiding rod 51, the other group of the positioning subassembly 53 is mounted on the other guiding rod 51. The positioning subassembly 53 includes a fixing member 531, a pair of rotation shafts 532, and a pair of rotation wheels 533. The fixing member 531 is mounted on an inner side surface of one guiding rod 51 facing the other guiding rod 51. The pair of rotation shafts 532 are assembled to opposite ends of the fixing member 531. The pair of rotation wheels 533 are respectively assembled to the pair of rotation shafts 532, and are located between the fixing member 531 and the guiding rod 51. The rotation wheels 533 resist a top of the workpiece 200 to position the workpiece 200 stably.

The inspection assembly 70 is assembled to the first fixing portion 13, and includes an inspection member 71 and an inspection controller 73. The inspection member 71 is assembled to the first fixing portion 13 and positioned above the transferring belt 30. The inspection controller 73 is assembled to the first fixing portion 13, and adjacent to the inspection member 71. The inspection controller 73 is electrically connected to the inspection member 71 for controlling the inspection member 71 to transmit laser beam directed toward the workpiece 200, thereby obtaining the thickness value of the workpiece 200. The inspection controller 73 transfers the thickness value to the controller 80. In the embodiment, the inspection assembly 70 is a laser detector.

Figure 4:
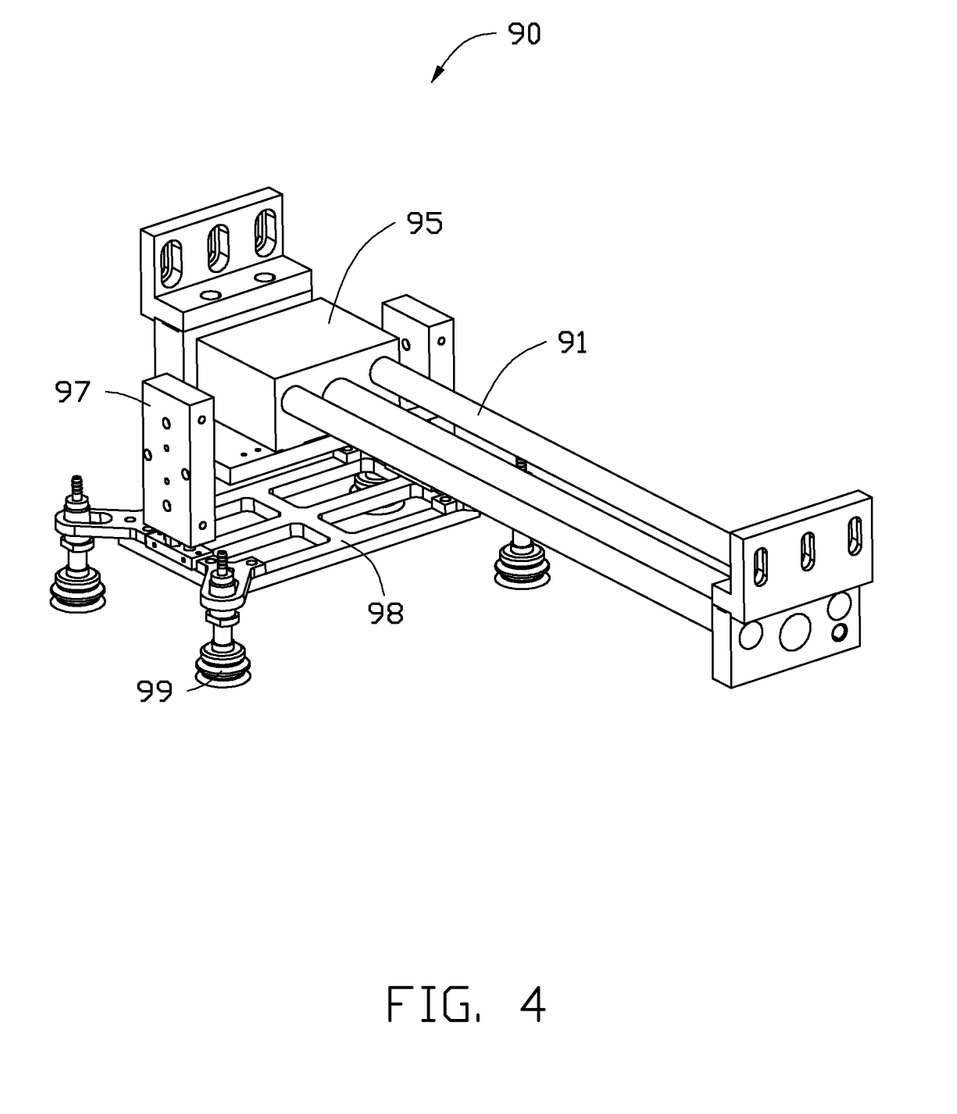
FIG. 4 is an enlarged view of the suction assembly of the size inspection device of FIG. 1.
Figure 5:
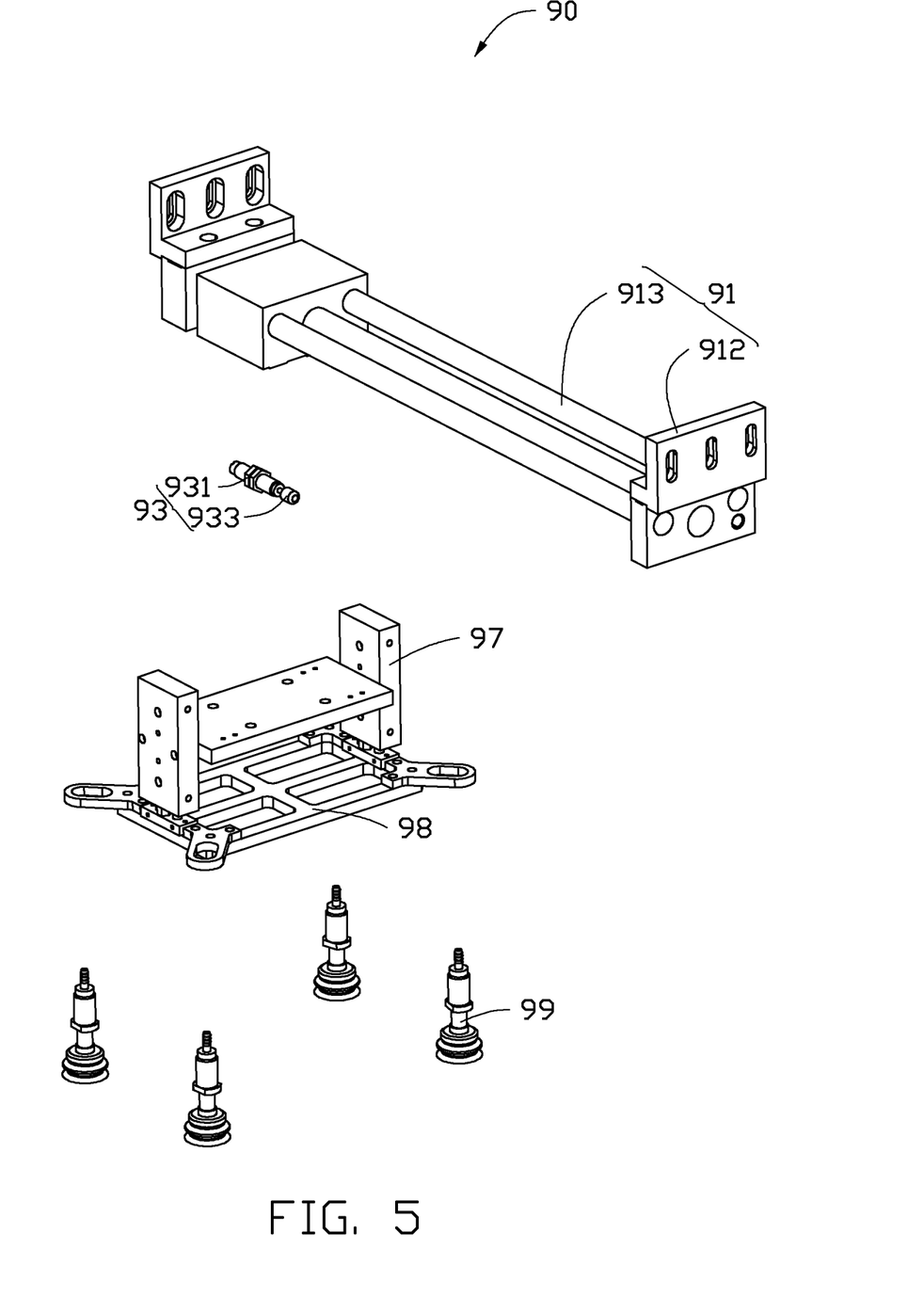
FIG. 5 is an exploded, isometric view of the suction assembly of FIG. 4.

FIGS. 4 and 5 shows that the suction assembly 90 is assembled to the second fixing portion 15, and includes a guiding member 91, a first driving member 93, a sliding member 95, a pair of second driving members 97, a supporting plate 98 and a plurality of suction members 99. The guiding member 91 is fixedly mounted on the second fixing portion 15, and includes a pair of mounting portions 912 and three sliding rods 913 interconnecting the pair of mounting portions 912. The pair of mounting portions 912 are spaced from each other, and assembled to the second fixing portion 15. The three sliding rods 913 are arranged spaced from each other, and perpendicular to the transferring direction of the transferring belt 30. The first driving member 93 is fixed to one mounting portion 912, and includes a driving body 931 and a driving portion 933 connected to the driving body 931. The driving body 931 is assembled to the mounting portion 912, the driving portion 933 protrudes out of the mounting portion 912 toward the other mounting portion 912. In the embodiment, the first driving member 93 is a telescopic cylinder. The sliding member 95 is slidably mounted on the three sliding rods 913, and connected to the driving portion 933. The sliding member 95 is driven by the first driving member 93 to slide along the three sliding rods 913. The pair of second driving members 97 is assembled to opposite sides of the sliding member 95, respectively. The supporting plate 98 is assembled to the pair of second driving members 97, and driven by the pair of second driving members 97 toward the transferring belt 30. The plurality of suction members 99 are separately distributed on the supporting plate 98, and resist on the workpiece 200 and generate a negative air pressure to suction onto the workpiece 200.

The controller 80 is assembled to the supporting portion 112 of the supporting bracket 11, and electrically connected to the inspection controller 73, the first driving member 93, and the second driving members 97. The controller 80 defines a preset standard range for determining whether the thickness value of the workpiece 200 is deemed or assessed to be pass or fail. When the inspection member 71 is controlled by the inspection controller 73 to transmit laser beam to the workpiece 200, the thickness value of the workpiece 200 is obtained by the inspection controller 73, and the inspection controller 73 transfers the thickness value to the controller 80, while simultaneously the workpiece 200 is transferred by the transferring belt 30 to the suction assembly 90. The controller 80 compares the thickness value of the workpiece 200 to a preset standard range to determine whether or not the workpiece 200 has passed quality inspection for thickness specification. If the workpiece 200 is not considered to be passing in quality inspection, the controller 80 controls the suction assembly 90 to suck on the workpiece 200. That is, the first driving member 93 drives the sliding member 95 to a position above the workpiece 200, and the pair of second driving members 97 drives the plurality of suction members 99 toward the workpiece 200 to provide suction to hold on to the workpiece 200. Then, the suction assembly 90 handles the workpiece 200 to the recycling portion 151 and releases the workpiece 200.

FIGS. 1 through 5 show that when in assembly, the first fixing portion 13 is assembled to the supporting portion 112 of the supporting bracket 11. The second fixing portion 15 stretches across the first fixing portion 13. The transferring belt 30 is assembled to the supporting portion 112. The pair of guiding rods 51 are parallelly mounted on the first fixing portion 13. The fixing member 531 is mounted on the inner side of the guiding rod Si. The pair of rotation shafts 532 is mounted on opposite ends of the fixing member 531. The pair of rotation wheels 533 are respectively rotatably mounted on the pair of rotation shafts 532. Then, the inspection member 71 and the inspection controller 73 are mounted on the first fixing portion 13, and the inspection controller 73 is electrically connected to the inspection member 71. The guiding member 91 is fixedly mounted on the second fixing portion 15. The first driving member 93 is fixed to the guiding member 91. The sliding member 95 is slidably mounted on the guiding member 91, and connected to the first driving member 93. The pair of second driving members 97 is assembled to opposite sides of the sliding member 95. The supporting plate 98 is assembled to the pair of second driving members 97, and driven by the pair of second driving members 97 toward the transferring belt 30. The plurality of suction members 99 are separately distributed on the supporting plate 98.

When in use, the workpiece 200 is transferred by the transferring belt 30 between the pair of guiding rods 51. The positioning assembly 50 drives the rotation wheels 533 to resist on top of opposite sides of the workpiece 200. The inspection member 71 is controlled by the inspection controller 73 to transmit laser beam to the workpiece 200, the inspection controller 73 obtains the thickness value of the workpiece 200 and transfers it (the thickness value) to the controller 80. Simultaneously, the transferring belt 30 transfers the workpiece 200 to the suction assembly 90. The controller 80 compares the (measured) thickness value of the workpiece 200 to the preset standard range for thickness specification tolerance) to determine whether or not the workpiece 200 has passed thickness quality inspection. If the workpiece 200 is not assessed to be passing inspection, the controller 80 controls the first driving member 93 to drive the sliding member 95 to the position above the workpiece 200, and the pair of second driving members 97 drives the plurality of suction members 99 toward the workpiece 200 to provide suction to hold on to the workpiece 200. Then, the suction assembly 90 handles and transfer the workpiece 200 to the recycling portion 151 and releases the workpiece 200. If the workpiece 200 is of passing quality, the transferring belt 30 continues to transfer the workpiece 200 to a next workstation.

The inspection assembly 70 is capable of obtaining the thickness value of the workpiece 200. The controller 80 determined whether or not the workpiece 200 is of passing quality, and controls the suction assembly 90 to handle the workpiece 200 which is assessed to be of failed quality (a.k.a. defect) to the recycling portion 151. Such that an inspection efficiency of the size inspection device 100 is thereby enhanced, and the performing of efficient size inspecting of workpieces by the size inspection device 100 leads to time saving.

The number of the second driving members 97 and the sliding rods 913 is not limited to the numbers that have been mentioned above, but may be changed according to actual usage requirement. The size or dimension inspected by the inspection assembly 70 is not limited to just the thickness dimension or value of the workpiece 200, that is to say, the size inspection device 100 may be employed to inspected a width or a length (or height) of the workpiece 200.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A size inspection device for inspecting size value of a workpiece automatically, comprising:
    an inspection frame;
    a transferring belt slidably mounted on the inspection frame;
    a positioning assembly mounted on the inspection frame and positioned above the transferring belt, the positioning assembly comprising:
        a pair of guiding rods mounted on the inspection frame, arranged parallel to each other, and positioned above the transferring belt, and
        a plurality of positioning subassemblies divided into two groups symmetrically arranged on the pair of guiding rods and resisting a top of the workpiece to position the workpiece on the transferring belt;
    an inspection assembly mounted on the inspection frame adjacent to the positioning assembly;
    a suction assembly mounted on the inspection frame spaced from the inspection assembly; and
    a controller mounted on the inspection frame and electrically connected to the inspection assembly and the suction assembly, wherein the positioning assembly positions the workpiece on the transferring belt below the inspection assembly, the inspection assembly obtains a size value of the workpiece and transfers the corresponding size value to the controller, the controller compares the size value to a preset standard range to determine whether or not the workpiece has passed quality inspection, and controls the suction assembly to handle the workpiece which has failed quality inspection away from the transferring belt.

2. The size inspection device of claim 1, wherein the inspection assembly comprises an inspection member and an inspection controller, the inspection member and the inspection controller are assembled to the inspection frame, the inspection controller is electrically connected to the inspection member for controlling the inspection member to transmit laser beam directed toward the workpiece, thereby obtaining the size value of the workpiece, the inspection controller transfers the size value to the controller.

3. The size inspection device of claim 1, wherein the inspection frame comprises a supporting bracket, a first fixing portion, and a second fixing portion, the supporting bracket comprises a supporting portion, the first fixing portion is fixed to the supporting portion, the second fixing portion stretches across opposite sides of the first fixing portion and is arranged parallel to the first fixing portion, the transferring belt is supported by the supporting portion and positioned below the first fixing portion and the second fixing portion for transferring the workpiece, the inspection assembly is mounted on the first fixing portion, the suction assembly is mounted on the second fixing portion.

4. The size inspection device of claim 3, wherein the second fixing, portion comprises a recycling portion on a side of the transferring belt, the suction assembly handles the workpiece which is assessed to be of failed quality to the recycling portion.

5. The size inspection device of claim 3, wherein the pair of guiding rods are mounted on the first fixing portion.

6. The size inspection device of claim 5, wherein each positioning subassembly comprises a fixing member, a pair of rotation shafts, and a pair of rotation wheels, the fixing member is mounted on an inner side surface of one guiding rod facing the other guiding rod, the pair of rotation shafts are assembled to opposite ends of the fixing member, the pair of rotation wheels are respectively assembled to the pair of rotation shafts, and located between the fixing member and the guiding rod.

7. The size inspection device of claim 3, wherein the suction assembly comprises a guiding member, a first driving member, a sliding member, at least one second driving members, a supporting plate and a plurality of suction members, the guiding member is fixedly mounted on the second fixing portion, the first driving member is fixed to the guiding member, the sliding member is slidably mounted on the guiding member and connected to the first driving member, the at least one second driving member is assembled to the sliding member, the supporting plate is assembled to the at least one second driving member, and driven by the at least one second driving member toward the transferring belt, the plurality of suction members are separately distributed on the supporting plate, and resist on the workpiece and generate a negative air pressure to suck the workpiece.

8. The size inspection device of claim 7, wherein the guiding member comprises a pair of mounting portions and at least one sliding rod interconnecting the pair of mounting portions, the pair of mounting portions are spaced from each other and assembled to the second fixing portion, the at least one sliding rod is perpendicular to a transferring direction of the transferring belt.

9. The size inspection device of claim 7, wherein the first driving member comprises a driving body and a driving portion connected to the driving body, the driving, body is assembled to the guiding member, the driving portion is connected to the sliding member.

10. A size inspection device for inspecting, size value of a workpiece automatically, comprising:
an inspection frame;
a transferring belt mounted on the inspection frame;
a positioning assembly mounted on the inspection frame and positioned above the transferring belt, the positioning assembly comprising:
a pair of guiding rods mounted on the inspection frame, arranged parallel to each other, and positioned above the transferring belt, and
a plurality of positioning subassemblies divided into two groups symmetrically arranged on the pair of guiding rods and resisting a top of the workpiece to position the workpiece on the transferring belt;
an inspection assembly mounted on the inspection frame above the positioning assembly, the inspection assembly comprising:
an inspection member; and
an inspection controller electrically connected to the inspection member; and
a controller mounted on the inspection frame and electrically connected to the inspection assembly, wherein the positioning assembly positions the workpiece on the transferring belt below the inspection assembly, the inspection controller controls the inspection member to transmit laser toward the workpiece, thereby obtaining the size value of the workpiece, the inspection controller transfers the size value to the controller, the controller compares the size value to a preset standard range to determine whether or not the workpiece has passed quality inspection, and controls a suction assembly to handle the workpiece which has failed quality inspection away from the transferring belt.

11. The size inspection device of claim 10, further comprising a suction assembly mounted on the inspection frame, wherein the suction assembly is electrically connected to the controller, the controller controls the suction assembly to transport the workpiece which is assessed to be of failing inspection away from the transferring belt.

12. The size inspection device of claim 11, wherein the inspection frame comprises a supporting bracket, a first fixing portion, and a second fixing portion, the supporting bracket comprises a supporting portion, the first fixing portion is fixed to the supporting portion, the second fixing portion stretches across opposite sides of the first fixing portion and is arranged parallel to the first fixing portion, the transferring belt is supported by the supporting portion and positioned below the first fixing portion and the second fixing portion for transferring the workpiece, the inspection assembly is mounted on the first fixing portion, the suction assembly is mounted on the second fixing portion.

13. The size inspection device of claim 12, wherein the second fixing portion comprises a recycling portion on a side of the transferring belt, the suction assembly handles the workpiece which is assessed to be failing quality to transport to the recycling portion.

14. The size inspection device of claim 12, wherein the pair of guiding rods are mounted on the first fixing portion.

15. The size inspection device of claim 14 wherein each positioning subassembly comprises a fixing member, a pair of rotation shafts, and a pair of rotation wheels, the fixing member is mounted on an inner side surface of one guiding rod facing the other guiding rod, the pair of rotation shafts are assembled to opposite ends of the fixing member, the pair of rotation wheels are respectively assembled to the pair of rotation shafts, and located between the fixing member and the guiding rod.

16. The size inspection device of claim 12, wherein the suction assembly comprises a guiding member, a first driving member, a sliding member, at least one second driving members, a supporting plate and a plurality of suction members, the guiding member is fixedly mounted on the second fixing portion, the first driving member is fixed to the guiding member, the sliding; member is slidably mounted on the guiding member and connected to the first driving member, the at least one second driving members is assembled to the sliding member, the supporting plate is assembled to the at least one second driving member, and driven by the at least one second driving member toward the transferring belt, the plurality of suction members are separately distributed on the supporting, plate, and resist on the workpiece and generate a negative air pressure to suck the workpiece.

17. The size inspection device of claim 16, wherein the guiding member comprises a pair of mounting portions and at least one sliding rod interconnecting the pair of mounting portions, the pair of mounting portions are spaced from each other and assembled to the second fixing portion, the at least one sliding rod is perpendicular to a transferring direction of the transferring belt.

18. The size inspection device of claim 16, wherein the first driving member comprises a driving body and a driving portion connected to the driving body, the driving body is assembled to the guiding member, the driving portion is connected to the sliding member.

\* \* \* \* \*